(12) United States Patent
Wang et al.

(10) Patent No.: US 8,774,820 B2
(45) Date of Patent: Jul. 8, 2014

(54) METHOD AND DEVICE FOR ALLOCATING SAME RESOURCE FOR A PLURALITY OF ENBS OF COLLABORATIVE MIMO

(75) Inventors: He Wang, Shanghai (CN); Zhongji Hu, Shanghai (CN)

(73) Assignee: Alcatel Lucent, Paris (FR)

( * ) Notice: Subject to any disclaimer, the term of this patent is extended or adjusted under 35 U.S.C. 154(b) by 244 days.

(21) Appl. No.: 13/256,076

(22) PCT Filed: Mar. 12, 2009

(86) PCT No.: PCT/CN2009/000263
§ 371 (c)(1),
(2), (4) Date: Sep. 12, 2011

(87) PCT Pub. No.: WO2010/102424
PCT Pub. Date: Sep. 16, 2010

(65) Prior Publication Data
US 2012/0088535 A1    Apr. 12, 2012

(51) Int. Cl.
*H04W 72/04* (2009.01)

(52) U.S. Cl.
USPC ............ 455/452.1; 455/452.2; 455/509; 455/67.11

(58) Field of Classification Search
USPC .......... 455/450, 452.1, 452.2, 509, 512, 66.1, 455/62, 67.11, 500; 370/330, 310, 319
See application file for complete search history.

(56) References Cited

U.S. PATENT DOCUMENTS

| 8,254,328 | B2 * | 8/2012 | Yoshida et al. | 370/330 |
| 2005/0043031 | A1 * | 2/2005 | Cho et al. | 455/450 |
| 2008/0132262 | A1 | 6/2008 | Jung et al. | |
| 2011/0134875 | A1 * | 6/2011 | Ding et al. | 370/329 |
| 2011/0194536 | A1 * | 8/2011 | Kim et al. | 370/335 |
| 2011/0207494 | A1 * | 8/2011 | Zhu et al. | 455/509 |
| 2013/0039284 | A1 * | 2/2013 | Marinier et al. | 370/329 |

FOREIGN PATENT DOCUMENTS

| CN | 1878022 A | 12/2006 |
| CN | 101373998 A | 2/2009 |
| EP | 1508992 A2 | 2/2005 |
| EP | 2312886 A1 | 4/2011 |
| EP | 2343838 A1 | 7/2011 |
| KR | 10-2008-0037398 | 4/2008 |

OTHER PUBLICATIONS

International Search Report for PCT/CN2009/000263 dated Dec. 17, 2009.

(Continued)

*Primary Examiner* — John J Lee
(74) *Attorney, Agent, or Firm* — Fay Sharpe LLP

(57) ABSTRACT

The present invention provides a method and device for allocating same resource for a plurality of eNBs of collaborative Multiple-input-Multiple-output (MIMO). Wherein a serving eNB firstly determines, in the one or more other eNBs, at least one candidate eNB recommended to cooperate with the serving eNB, according to measurement report reported by mobile stations or according to report information of the recommended candidate eNB reported by mobile station, then obtains resource related information of the at least one candidate eNB, then determines one or more collaborative eNBs from the at least one candidate eNB according to the resource related information, and allocates corresponding communication resources for the serving eNB and the one or more collaborative eNBs. The solution according to the present does not need to reserve special resource for collaborative MIMO, reduces waste of resource, and meets the requirement of resource for implementing collaborative MIMO by different serving eNBs flexibly, and increases the success rate of implementing collaborative MIMO.

14 Claims, 6 Drawing Sheets

(56) References Cited

OTHER PUBLICATIONS

Alcatel Shanghai Bell, et al. "Collaborative MIMO for LTE-A downlink" 3GPP TSG RAN WG1 Meeting #53Bis; R1-082501, $3^{rd}$ Generation Partnership Project (3GPP) vol. RAN WG1, Jun. 24, 2008, pp. 1-6.

Motorola. "Downlink RS Design for Supporting Higher Order SU/MU-MIMO and CoMP" TSG-RAN WG1 #56, R1-090796, $3^{rd}$ Generation Partnership Project (3GPP), Feb. 3, 2009, pp. 1-8.

Huawei, et al. "Discussion on Timing Advance Issue in CoMP & Text Proposal" 3GPP TSG RAN WG1 meeting #56, R1-090823, Feb. 9-13, 2009, pp. 1-9.

Extended European Search Report for Appl. No. EP 09 84 1293 dated Oct. 22, 2013.

CMCC. "UL CoMP Scheme and System Level Performance Evaluation" 3GPP TSG-RAN WG1#56, R1-090923, Feb. 9-13, 2009, pp. 1-11.

Motorola. "LTE-A Multiple Point Coordination and its Classification" TSG-RAN WG1 #54, R1-083229, Aug. 18-22, 2008, pp. 1-6.

* cited by examiner

METHOD AND DEVICE FOR ALLOCATING SAME RESOURCE FOR A PLURALITY OF ENBS OF COLLABORATIVE MIMO

FIELD OF THE INVENTION

The present invention relates to communication network, especially to wireless MEMO communication network.

BACKGROUND OF THE INVENTION

In IMT-advanced (International Mobile Telecommunications-Advanced), the collaborative MIMO (Multiple-Input-Multiple-Output) solution becomes an efficient method to improve the system coverage and spectral efficiency by using a plurality of eNBs (evolved Node B, hereinafter referred to as eNB) to provides one or more mobile stations (MS) with data service via cooperation among the plurality of eNBs to reduce the ICI (Inter-Cell Interference). To implement the collaborative MIMO transmission, same resource needs to be allocated for a plurality of eNBs performing, collaborative MIMO, that is, resource synchronization.

The so-called collaborative MIMO means that both eNB and MS have a plurality of antennas, at least a plurality of eNBs communicate with one MS, one eNB may communicate with one or more MSs. In collaborative MIMO, the serving eNB of one MS requests the neighboring cell eNB to participate in the collaborative MIMO transmission and indicates the resource allocated for this collaboration MEMO to the neighboring cell eNB requested to participate in the collaborative MIMO. If there is no conflict between the resource allocated for the neighboring cell eNB by the serving eNB and the resource of the neighboring cell eNB, then the collaborative MIMO transmission for this MS may be established. Referring to FIG. 1, FIG. 1 shows a schematic diagram of topology of traditional cellular cell, taking traditional hexagonal cell model as an example for illustration. Each MS has only one serving eNB, the serving eNB of MS is determined during the initial access of MS, MS may handover from original source serving eNB to a new object eNB with the movement of MS. MS $2a$ may be taken as a example to illustrate. The serving eNB of MS $2a$ is eNB $1a$, since network model is of hexagonal structure, one serving eNB at most has two neighboring cells which may participate in the collaborative MIMO with the serving eNB, the neighboring cell eNB performing the collaborative MIMO with the serving eNB and the serving eNB constitute one collaborative cell cluster. Certainly, in actual network, the serving eNB may have a plurality of neighboring eNBs (hereinafter referred to as neighboring cell eNB). As shown in FIG. 1, the dot oval frame denotes a collaborative cell cluster performing collaborative MIMO service for MS $2a$, constituted by the serving eNB $1a$, neighboring cell eNBs $1b$ and $1c$. In this collaborative cell cluster, the serving eNB $1a$ determines resource allocation for this collaborative MIMO transmission.

neighboring cell eNB $1b$ shown in FIG. 1 may also be taken as a serving eNB in one collaborative cell cluster and determine MS (not shown in Fig) dominated by it, in this collaborative cell cluster. When each serving eNB allocates resource respectively, it is easy to cause resource conflict and result in CO-MIMO failure.

An existing resource allocation manner for CO-MIMO is shown in FIG. 2, the shadow with slash lines denotes the resource which may be used for CO-MIMO by eNB $1a$ as serving eNB, the blank area denotes the resource which may be used for CO-MIMO by eNB $1b$ as serving eNB, the shadow with vertical lines denotes the resource which may be used for CO-MIMO by eNB $1c$ as serving eNB, that is, each eNB reserves a part of fixed resource as resource area which may be allocated for collaborative MIMO while it acts as a serving eNB, and the reserved resource areas allocated for each serving eNB to be used for collaborative MIMO with other eNBs are all orthogonal to each other, that is, there is no overlapping part between any two resource areas, so as to guarantee there is no conflict of resources for collaborative MIMO. However, the efficiency of the resource allocation manner, which defining the resource allocation of serving eNB and collaborative eNB in a cell cluster for collaborative MIMO in a predetermined area, is very low. Its disadvantages are as follows:

the reserved resource will be waste, If there is no MS or few MSs desiring collaborative MIMO communication.

if there are too many MSs desiring collaborative MIMO in one cell dominated by serving eNB, the reserved resource for this serving eNB will not meet the requirement of collaborative MIMO, so as to cause collaborative MIMO failure.

furthermore, that how to define the initial reserved resource area effectively in this predetermined fixed scheme is a problem.

SUMMARY OF THE INVENTION

In order to solve the aforesaid problems in the prior art, the present invention proposes: firstly, the serving eNB determines, in the one or more other eNBs, at least one candidate eNB recommended to cooperate with the serving eNB; then, obtains resource related information of the at least one candidate eNB; and then determines one or more collaborative eNBs from the at least one candidate eNB according to the resource related information, and allocates corresponding communication resources for the serving eNB and the one or more collaborative eNBs.

According to the first aspect of the present invention, there is provided a method, in a serving eNB of wireless communication network based on collaborative Multiple-Input-Multiple-Output, for allocating communication resources for the serving eNB and one or more collaborative eNBs that collaboratively process mobile station service, wherein the method comprises the following steps: determining, in the one or more other eNBs, at least one candidate eNB recommended to cooperate with the serving eNB; obtaining resource related information of the at least one candidate eNB; determining one or more collaborative eNBs from the at least one candidate eNB according to the resource related information, and allocating corresponding communication resources for the serving eNB and the one or more collaborative eNBs.

According to the second aspect of the present invention, there is provided a method, in a candidate eNB of wireless communication network based on collaborative Multiple-Input-Multiple-Output, for assisting a serving eNB in allocating communication resources for the serving eNB and one or more collaborative eNBs that collaboratively process mobile station service, wherein the method comprises the following step: sending resource related information to the serving eNB.

According to the third aspect of the present invention, there is provided a method, in a mobile station of wireless communication network based on collaborative Multiple-Input-Multiple-Output, for assisting a serving eNB in allocating communication resources for the serving eNB and one or more collaborative eNBs that collaboratively process mobile station service, wherein the method comprises the following steps: measuring signal quality related information between the mobile station and the serving eNB, and between the mobile station and one or more other eNBs; determining at least one candidate eNB recommended to cooperate with the serving eNB, according to the signal quality related information; generating candidate eNB indication information for indicating the at least one candidate eNB according to the at least one candidate eNB, and sending the candidate eNB indication information to the serving base station.

According to the fourth aspect of the present invention, there is provided a first collaborative device, in a serving eNB of wireless communication network based on collaborative Multiple-Input-Multiple-Output, for allocating communication resources for the serving eNB and one or more collaborative eNBs that collaboratively process mobile station service, wherein the device comprises: a means for determining candidate eNB, configured to determine, in the one or more other eNBs, at least one candidate eNB recommended to cooperate with the serving eNB; a means for obtaining resource information, configured to obtain resource related information of the at least one candidate eNB; a means for processing, configured to determine the one or more collaborative eNBs from the at least one candidate eNB according to the resource related information, and to allocate corresponding communication resources for the serving eNB and the one or more collaborative eNBs.

According to the fifth aspect of the present invention, there is provided a second collaborative device, in candidate eNB of wireless communication network based on collaborative Multiple-Input-Multiple-Output, for assisting a serving eNB in allocating communication resources for the serving eNB and one or more collaborative eNBs that collaboratively process mobile station service, wherein the device comprises: a means for sending resource information, configured to send resource related information to the serving eNB.

According to the sixth aspect of the present invention, there is provided An assisting device, in a mobile station of wireless communication network based on collaborative Multiple-Input-Multiple-Output, for assisting a serving eNB in allocating communication resources for the serving eNB and one or more collaborative eNBs that collaboratively process mobile station service, wherein the device comprises: a means for measurement, configured to measure signal quality related information between the mobile station and the serving eNB, and between the mobile station and one or more other eNBs; a means for recommendation, configured to determine at least one candidate eNB recommended to cooperate with the serving eNB, according to the signal quality related information; a means for sending, configured to generate candidate eNB indication information for indicating the at least one candidate eNB according to the at least one candidate eNB, and send the candidate eNB indication information to the serving base station.

The solution according to the present does not need to reserve special resource for collaborative MIMO, reduces waste of resource, and meets the demand for resource for implementing collaborative MIMO by different serving eNBs flexibly, and increases the success rate of implementing collaborative MIMO.

BRIEF DESCRIPTION OF THE DRAWINGS

By reading the detailed description of the non-limiting embodiments with reference to the following drawings, other features, objects and advantages of the present invention will become apparent.

In drawings, same or similar reference signs refer to the same or similar device (module) or step.

DETAILED DESCRIPTION OF EMBODIMENTS

Figure 1:
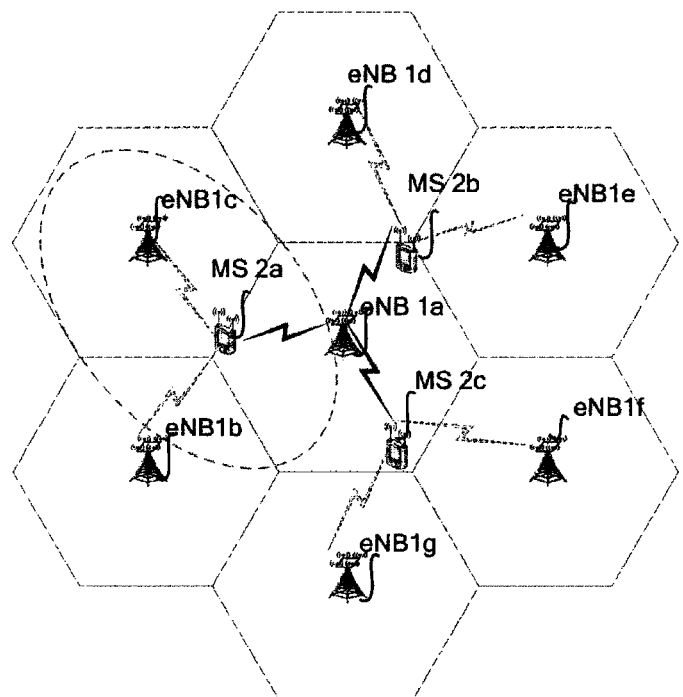
FIG. 1 shows a schematic diagram of topology of traditional cellular cell.
Figure 2:
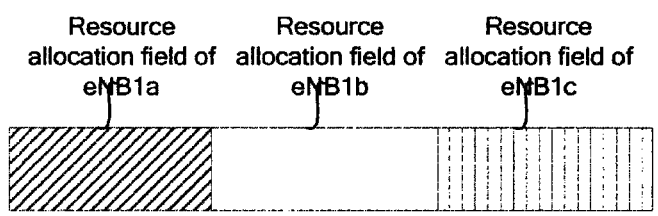
FIG. 2 shows an existing resource allocation manner.

Referring to FIG. 1, the network topology of the present invention is described as follows. MS 2a is taken as example for illustration. eNB 1a is the serving eNB of MS 2a, furthermore, MS 2a may also receive signals from other neighboring eNBs, that is, neighboring cell eNBs of eNB 1a, including eNB 1b and eNB 1c. In LTE-Advanced system. eNB 1a interconnects with eNB 1b and eNB 1c via X2 interfaces.

Figure 3:
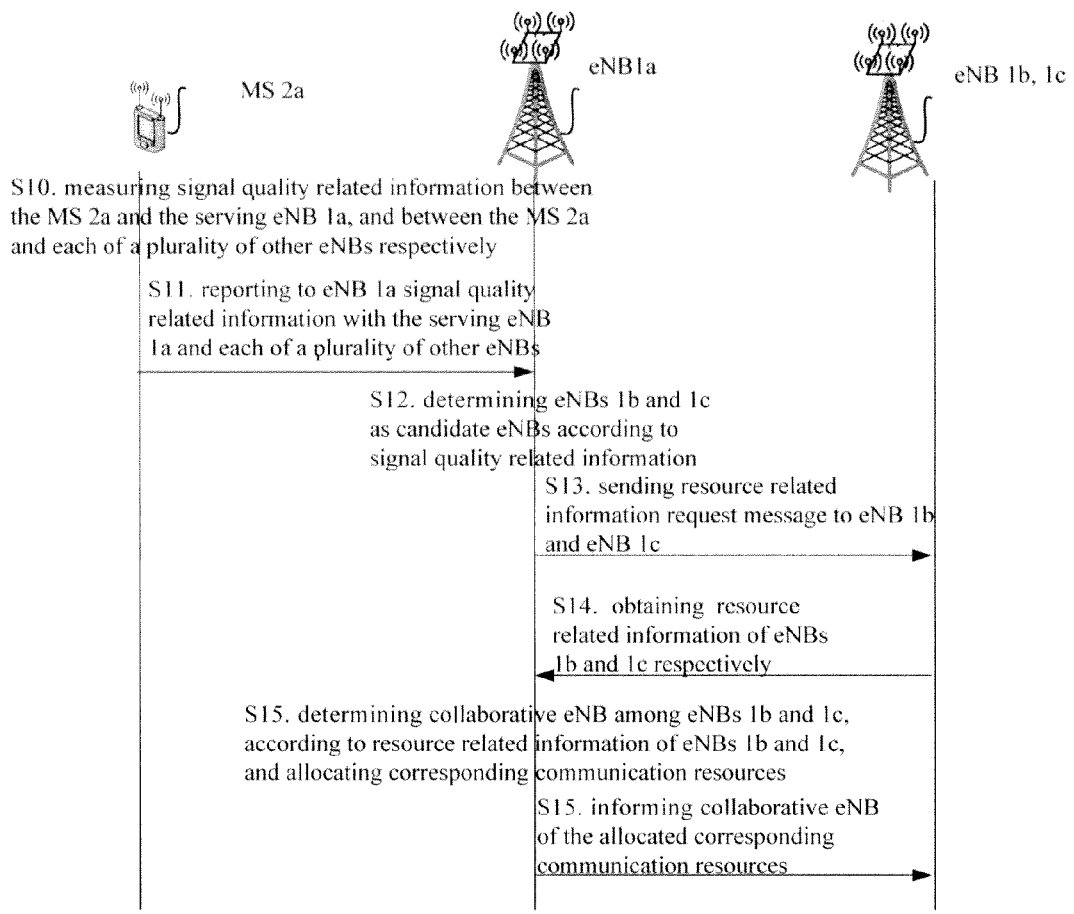
FIG. 3 shows a flowchart of system method according to a detailed embodiment of the present invention.

Hereinafter, referring to FIG. 3 and in combination with FIG. 1, flowchart of system method of the present invention is described as follows. FIG. 3 shows a flowchart of system method according to a detailed embodiment of the present invention.

In step S10, the MS 2a measures signal quality related information between the MS 2a and the serving eNB 1a, and between the MS 2a and each of other eNBs respectively. In this embodiment, signal quality related information is illustrated with signal strength. It may be understood that it is only exemplary here and signal quality related information is not limited to aforesaid contents and may be also RSSI (Received Signal Strength Indication), RSRP (Reference Signal Received Power), CQI (Channel Quality Indication) or CSI (Channel State Indication).

The MS 2a is located at cell edge area and may detect signal strength with the serving eNB 1a and signal strength with each of neighboring cell eNBs 1b, 1c, and 1d, for example, which are 110 dBm, 92 dBm, 85 dBm and 50 dBm respectively.

Then, in step S11, the MS 2a reports to eNB 1a signal quality related information with the serving eNB 1a and with each of a plurality of other eNBs. The signal quality related information comprises the type of the reported measurement value, which is RSSI in this embodiment, and further comprises the measured values.

Particularly, that when the MS 2a reports may be divided into the following two manners:

event trigger:

in the phase of network entry, the MS 2a knows that it needs to report to the serving eNB 1a other eNBs whose signal strengths exceed a third predetermined threshold value and the signal strengths corresponding to these eNBs in order to perform collaborative MIMO among a plurality of eNBs. For example, the reported threshold pre-stored in the MS 2a is 80 dBm, that is, when the MS 2a detects that the signal strength corresponding to eNB exceeds 80 dBm, the MS 2a will report to the serving eNB 1a this eNB and the signal strength corresponding to this eNB. For example, when the MS 2a detects that the signal strengths with neighboring cell eNBs 1b, 1c and 1d are 92 dBm, 85 dBm and 50 dBm respectively, in order to reduce uplink signaling overhead and increase the reliability of collaborative MIMO, the MS 2a only reports to the serving eNB 1a the neighboring cell eNBs having good signal qualities, that is, the eNB whose signal strengths exceeds the third predetermined threshold, comprising: eNB 1b and eNB 1c, and signal strength between the MS 2a and eNB 1b, signal strength between the MS 2a and eNB 1c. Therefore, the MS 2a reports to the serving eNB 1a, the serving eNB 1a and other eNBs 1b and 1c, whose signal strength with the MS 2a are 110 dBm 92 dBm and 85 dBm, respectively.

Or, in a varied embodiment, it may be specified that the MS 2a only reports the signal strength of the two neighboring cell eNBs whose measured signal strengths are the strongest. The aforesaid parameters are still taken as example, then the MS 2a reports to the serving eNB 1a signal strengths of the serving eNB 1a and the two neighboring cell eNBs whose signal strengths are the strongest, which are 110 dBm, 92 dBm and 85 dBm respectively.

Furthermore, alternatively, if the uplink signaling overhead of system is not considered, once the MS 2a detects signal from a neighboring cell eNB, it may report to the serving eNB 1a this neighboring cell eNB and signal strength corresponding to this neighboring cell eNB, that is, the MS 2a reports to the serving eNB 1a all of the detected signal strengths and eNBs corresponding to these detected signal strengths. For example, the MS 2a reports the signal strengths with the serving eNB 1a and eNBs 1b, 1c, and 1d, which are 110 dBm, 92 dBm 85 dBm and 50 dBm respectively.

periodical trigger:

the MS 2a comprises timer for sending measurement report, when the timer reaches a predetermined time, it means that the MS 2a needs to report to the serving eNB 1a the detected signal quality related information of a plurality of other eNBs. For example, if the timer expires, the MS 2a reports to the serving eNB 1a the signal strengths between each of the serving eNB 1a, other eNBs 1b and 1c and the MS 2a, which are 110 dBm, 92 dBm and 85 dBm respectively; or the MS 2a reports the signal strengths with each of the serving eNB 1a, eNBs 1b, 1c and 1d, which are 110 dBm, 92 dBm 85 dBm and 50 dBm respectively.

Then, in step S12, the serving eNB 1a determines eNBs 1b and 1c as candidate eNBs according to signal quality related information reported by the MS 2a.

Particularly, a first predetermined threshold value is pre-stored in the serving eNB 1a, the first predetermined threshold value is used for selecting candidate eNB, desired by the serving eNB 1a to collaboratively process service of the MS 2a with this serving eNB 1a, according to physical signal strength. When the serving eNB 1a selects candidate eNB, at least the magnitude of RSSI value is considered, moreover, the serving eNB 1a may also need to consider the difference value of signal strength between eNB 1b and eNB 1c.

For example, the first predetermined threshold value pre-stored in the serving eNB 1a is 90 dBm, and a second predetermined threshold value is 10 dBm. The second predetermined threshold value is used for judging the difference level of signal strength among a plurality of other eNBs.

The aforesaid parameters are still taken as example. The serving eNB 1a firstly judges whether signal strength from other eNBs is higher than the first predetermined threshold value 90 dBm.

if the signal strengths of both neighboring cell eNBs are higher than the first predetermined threshold value, then these two neighboring cell eNBs are both taken as candidate eNBs. For example, for the MS 2b, as shown in FIG. 1, the MS 2b reports to the serving eNB 1a the signal strengths with each of the serving eNB 1a, other eNBs 1d and 1e. If the signal strengths between the MS 2b and each of neighboring cell eNBs 1d and 1e, which are obtained by the serving eNB 1a and are from the report of the MS 2b, are 95 dBm and 105 dBm respectively, both being higher than 90 dBm, then the serving eNB 1a takes both eNBs 1d and 1e as candidate eNBs.

if the signal strength value of only one eNB of two neighboring cell eNBs is higher than the first predetermined threshold value, and the difference value between signal strengths of the two neighboring cell eNBs is higher than the second predetermined threshold value, then the eNB whose signal strength is higher than the first predetermined threshold value is taken as candidate eNB. For example, for the MS 2c, as shown in FIG. 1, the MS 2c reports to the serving eNB 1a the signal strengths with each of the serving eNB 1a, other eNBs 1b and 1g. If the signal strengths between the MS 2c and each of neighboring cell eNBs 1b and 1g, which are obtained by the serving eNB 1a and are from the report of the MS 2c, are 100 dBm and 80 dBm respectively, only 100 dBm being higher than 90 dBm, and the difference value of these two signal strengths is 20 dBm, higher than the second predetermined threshold value 10 dBm, then the serving eNB 1a only takes other eNBs 1b as candidate eNB.

if the signal strength value of only one eNB of two neighboring cell eNBs is higher than the first predetermined threshold value, and the difference value between signal strengths of the two neighboring cell eNBs is less than the second predetermined threshold value, then serving eNB takes both two neighboring cell eNBs as candidate eNBs. For example, for the MS 2a, the MS 2a reports to the serving eNB 1a the signal strengths with each of the serving eNB 1a, other eNBs 1b and 1c. The signal strengths between the MS 2a and each of neighboring cell eNBs 1b and 1c, which are obtained by the serving eNB 1a and are from the report of the MS 2a, are 92 dBm and 85 dBm respectively, only 92 dBm being higher than 90 dBm, and the difference value of these two signal strengths is 7 dBm, less than the second predetermined threshold value 10 dBm, then the serving eNB 1a takes both other eNBs 1b and 1c as candidate eNBs. This practice broadens the limitation to signal strength of neighboring cell eNB, since the different value of respective signal strength of two neighboring cell eNBs is less the second predetermined threshold value, signal strengths are relative close to each other so that it will not cause the weaker signal to be submerged because one signal is too strong and the other is too weak.

Then, in step S13, the serving eNB 1a sends resource related information request message to eNB 1b and eNB 1c.

In order to reduce redundant information interaction between the serving eNB 1a and other eNBs, the serving eNB 1a sends resource related information request message only to the candidate eNB selected by it. For example, the serving eNB 1a sends resource related information request message to the selected candidate eNBs 1b and 1c. The resource related information request message is used for requesting the candidate eNBs 1b and 1c to send resource related information to the serving eNB 1a. The serving eNB 1a interacts with other eNBs via X2 interfaces.

After candidate eNB receives the resource related information request message from the serving eNB 1a, the method goes into step S14, eNBs 1b and 1c respectively send respective resource related information to the serving eNB 1a. The serving eNB 1a may extract information related to available resource of eNBs 1b and 1c from the resource related information.

Certainly, there are at least two kinds of forms of resource related information: indication information of the occupied resource and indication information of the available resource.

Bit MAP is taken as example to illustrate resource related information. For example, the available bandwidth for each eNB is 5M, assuming multiplexing coefficient is 1, that is, each eNB may use the same frequency resource. For each eNB, for example, the allocation granularity of the bandwidth 5M is RB (Resource Block). In bit MAP, 0 denotes that the resource block is available namely idle, 1 denotes that the resource block is not available, that is, the resource block has already been allocated, or vice versa. And bit MAP is indexed to form pattern of resource related information.

For example, in respective resource related information which eNBs 1b and 1c respectively send to the serving eNB 1a, the pattern of the resource related information of eNB 1b indicates that the resource blocks number 5 to number 33 of eNB 1b are not allocated and are still available, the pattern of the resource related information of eNB 1c indicates that the resource blocks numbers 17 to 40 of eNB 1c are available.

Then, in step S15 the serving eNB 1a determines collaborative eNB among eNBs 1b and 1c according to resource related information of eNBs 1b and 1c, and allocates corresponding communication resources.

In the following scenarios, several scenarios, in which there are common available resources among the serving eNB 1a and each of eNBs 1b and 1c, are discussed respectively:

i) there is no common available resource either between the serving eNB and eNBs 1b or between the serving eNB 1a and eNBs 1c:

for example, the available resources of the serving eNB 1a are the resource blocks number 45 to number 60, the aforesaid parameters are still taken as example, that is, the available resources of eNB 1b are the resource blocks number 5 to number 33, the available resources of eNB 1c are the resource blocks number 17 to number 40. The available resources of the serving eNB 1a do not have intersection either with the available resources of eNB 1b or with the available resources of eNB 1c. Therefore, the serving eNB 1a can not perform collaborative MIMO with neighboring cell eNB. Therefore, the method ends here, and the subsequent steps are not needed.

ii) there are same common available resources among the serving eNB 1a, eNB 1b and eNB 1c:

for example, the available resources of the serving eNB 1a are the resource blocks number 10 to number 25, the aforesaid parameters are still taken as example, that is, the available resources of eNB 1b are the resource blocks number 5 to number 33, the available resources of eNB 1c are the resource blocks number 17 to number 40. The resource blocks number 17 to number 25 are the same common available resources among the serving eNB 1a and eNB 1b and eNB 1c. Therefore, the serving eNB 1a takes both eNB 1b and eNB 1c as collaborative eNBs for collaborative MIMO and allocates resources in the resource blocks number 17 to number 25 for eNB 1b and eNB 1c.

iii) there are respectively common available resources between the serving eNB 1a and eNB 1b and between the serving eNB 1a and eNB 1c, but the common available resources between the serving eNB 1a and eNB 1b does not have intersection with the common available resources between the serving eNB 1a and eNB 1c:

for example, the available resources of the serving eNB 1a are the resource blocks number 10 to number 25 and the resource blocks number 50 to number 64, the available resources of eNB 1b are the resource blocks number 15 to number 45, the available resources of eNB 1c are the resource blocks number 40 to number 60. Therefore, the resource blocks number 15 to number 25 are the common available resources between the serving eNB 1a and eNB 1b, the resource blocks number 50 to number 60 are the common available resources between the serving eNB 1a and eNB 1c, these two common available resources do not have intersection between each other. Now, the serving eNB 1a further selects the one with better signal quality as collaborative eNB according to signal qualities of the two candidate eNBs. For example, the signal strength between eNB 1b and the MS 2a is 92 dBm, the signal strength between eNB 1c and the MS 2a is 85 dBm. Since the signal strength between eNB 1b and the MS 2a is higher than the signal strength between eNB 1c and the MS 2a, the serving eNB 1a selects eNB 1b as collaborative eNB.

Then, the serving eNB 1a determines corresponding MCS (Modulation and Coding Scheme) according to QoS (Quality of Service) of the service requested by the MS 2a, and allocates a part or all of common available resources for the serving eNB 1a and the determined collaborative eNB according to the MCS, granularity of resource allocation, single allocation or allocation in pairs, to perform collaborative MIMO. For example, the scenario i) is taken as example, the serving eNB 1a allocates the resource blocks number 18 to number 21 of the resource blocks number 17 to number 25 for the serving eNB 1a, eNB 1b and eNB 1c, so that the serving eNB 1a, eNB 1b and eNB 1c perform collaborative MIMO on the same resource blocks number 18 to number 21, and sends collaborative MIMO request to eNB 1b and eNB lc, which comprises the sequence number 18-21 of the resource blocks for collaborative MIMO, allocated for eNB 1b and eNB 1c by the serving eNB 1a.

In a varied embodiment, prior to the step S11, the method further comprises the following step, the serving eNB 1a sends to the MS 2a measurement control message for requesting measurement report, the measurement control message comprises the type of the desired MS measurement and the threshold value of the reported measurement value. Then, in the step S12, the MS 2a measures and reports according to the measurement control message received from the serving eNB 1a.

In aforesaid embodiment, in the step S11, the serving eNB 1a obtains the measurement report reported by the MS 2a, the measurement report comprises not only the signal quality between the MS 2a and the serving eNB 1a but also the signal quality between the MS 2a and other eNBs. In a varied embodiment, for example, for TDD system, the serving eNB 1a may measure via uplink sounding signal and obtain corresponding downlink signal quality from uplink signal quality according to the reciprocity of TDD system, therefore, the serving eNB 1a may measure signal quality with the MS 2a by itself and receive signal quality related information between this MS and other eNB, reported by the MS 2a. That is, the MS 2a does not need to report to its serving eNB 1a the signal quality related information between the MS 2a and the serving eNB 1a.

In aforesaid embodiment, existing measurement control and measurement report between each MS and serving eNB may be reused. In a varied embodiment, considering that MS develops towards the trend of more intelligent, its computing speed and process capability are higher and higher. Therefore, a kind of new signaling may be defined, or a kind of new measurement type is defined in measurement types, so the step S12 may be finished by MS, that is, the MS 2a judges that which neighboring cell eNBs are selected as candidate eNBs according to measurement results with the serving eNB 1a and neighboring eNBs (for example, eNB 1b, eNB 1c), measured by itself, and generates corresponding candidate eNB indication information and sends the candidate eNB indication information to serving eNB. The detailed judging process is described in aforesaid step S12 in details, it is not necessary to repeat again. Then in step S13, the serving eNB 1a sends resource related information request message to corresponding candidate eNB according to candidate eNB indication information from the MS 2a.

In the step S13 of aforesaid embodiment, that the serving eNB 1a sends resource related information request message to eNB 1b and eNB 1c is for the purpose of reducing signaling overhead between eNB and eNB. Without considering signaling overhead, the step S13 may be omitted, for example, neighboring eNBs may report their resource related information to the serving eNB 1a periodically, and it is not necessary for neighboring eNBs to trigger the report upon receiving the request message from the serving eNB 1a.

Figure 4:
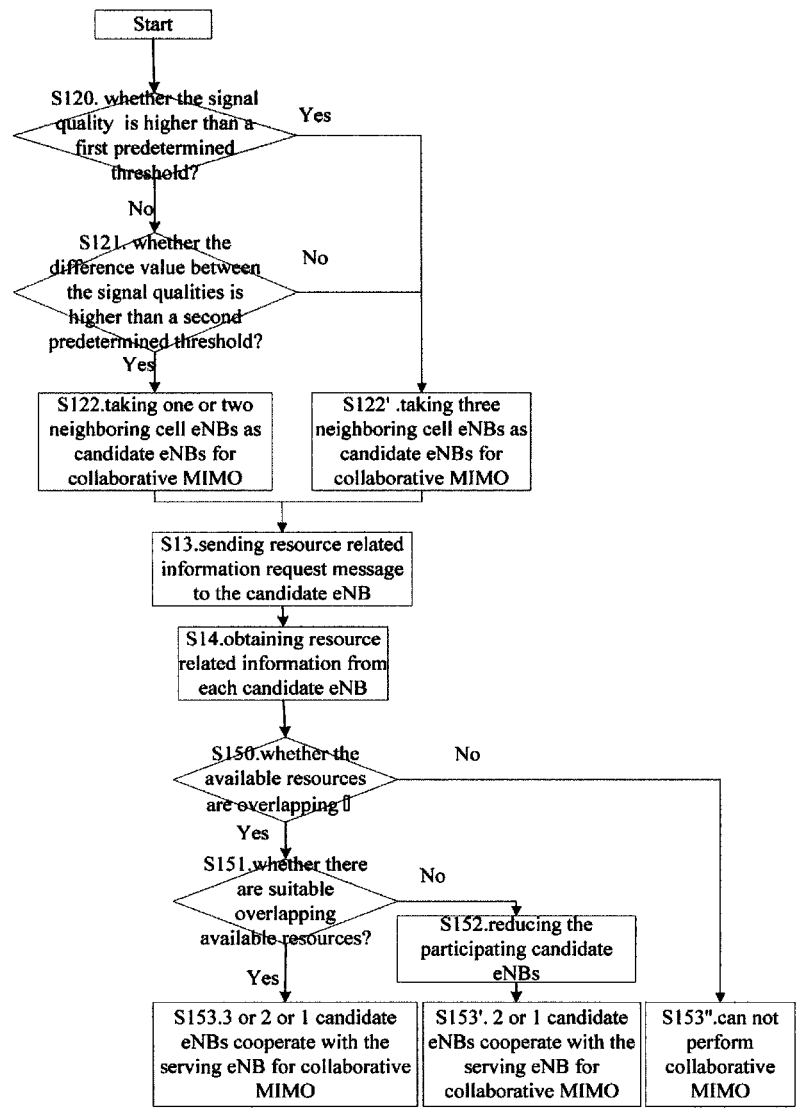
FIG. 4 shows a flowchart of method of the step S12 to the step S15 according to another detailed embodiment of the present invention.

In aforesaid embodiment, the scenario in which the MS 2a reports to the serving eNB 1a the signal strengths between the MS 2a and each of two neighboring cell eNBs, is taken as example for illustration. In a varied embodiment, the MS 2b is taken as example, for example, the MS 2b reports to the serving eNB 1a the signal strengths between the MS 2a and each of a plurality of neighboring cell eNBs, which comprise eNB 1d, eNB 1e and eNB 1b. FIG. 4 shows a method flowchart from step S12 to step S15 performed by the serving eNB 1a, taking the MS 2b as a detailed embodiment. Hereinafter, in combination with FIG. 4, the flowchart is described as follows:

In step S120, firstly, the serving eNB 1a judges whether the signal strength between each of three neighboring cell eNBs and the MS 2b is higher than the first predetermined threshold.

if the judging result of the serving eNB 1a is that the signal strength between each of three neighboring cell eNBs and the MS 2b is higher than the first predetermined threshold, then the method goes into the step S122', the serving eNB 1a takes all of three neighboring eNBs 1b, 1d and 1e as candidate eNBs for collaborative MIMO;

if the judging result of the serving eNB 1a is that not all the signal strengths from the three neighboring cell eNBs are higher than the first predetermined threshold, for example, the signal strength from eNB 1b is less than the first predetermined threshold, but the signal strengths from eNB 1d and eNB 1e are higher than the first predetermined threshold, then the method goes into the step S121, the serving eNB 1a judges whether the difference value between the signal strength of the one that is less than the first predetermined threshold, and the signal strength of the minimal in these signal strengths which are higher than the first predetermined threshold, is higher than the second predetermined threshold. For example, the first predetermined threshold is 90 dBm, and the second predetermined threshold is 10 dBm. The signal strengths from eNB 1d and eNB 1e are respectively 100 dBm and 92 dBm, and the signal strength from eNB 1b is 88 dBm. The serving eNB 1a firstly judges that the signal strengths from eNB 1d and eNB 1c are higher than the first predetermined threshold, but the signal strength from eNB 1b is less than the first predetermined threshold, thus the serving eNB 1a firstly takes eNBs 1d and 1e as candidate eNBs, then the method goes into the step S121, the serving eNB 1a further compares the difference value between the signal quality from eNB 1b and the signal quality from eNB 1e, the serving eNB finds that the difference value of the signal quality from eNB 1e 92 dBm minus the signal quality from eNB 1b 88 dBm is less than the second predetermined threshold, thus the serving eNB 1a also takes eNBs 1b as candidate eNB;

if the first predetermined threshold is 90 dBm, and the second predetermined threshold is 10 dBm, the signal strengths from eNB 1d and eNB 1e are respectively 100 dBm and 95 dBm, and the signal strength from eNB 1b is 80 dBm. Then in the step S121, the judging result of the serving eNB 1a is the difference value of the signal strength between eNB 1b and MS, and the signal strength between eNB 1e and MS is higher than the second predetermined threshold, thus in the step S122, the serving eNB 1a only takes the two neighboring cell eNBs 1d and 1e as candidate eNBs for collaborative MIMO;

furthermore, if the signal quality of only one eNB is higher than the first predetermined threshold, for example, only the signal quality of eNB 1d is higher than the first predetermined threshold, and the difference value of signal quality between eNB 1b and eNB 1d, and the difference value of signal quality between eNB 1e and eNB 1d are both higher than the second predetermined threshold, then the judging result of the serving eNB 1a is that only eNB 1d is taken as candidate eNB for collaborative MIMO.

Then, in step S13, the serving eNB 1a sends resource related information request message to the selected candidate eNB; then, in step S14, the serving eNB obtains resource related information from each candidate eNB.

Then, in step S150, the serving, eNB 1a judges whether the available resources from each candidate eNB overlaps the available resources of the serving eNB 1a.

Figure 5A:
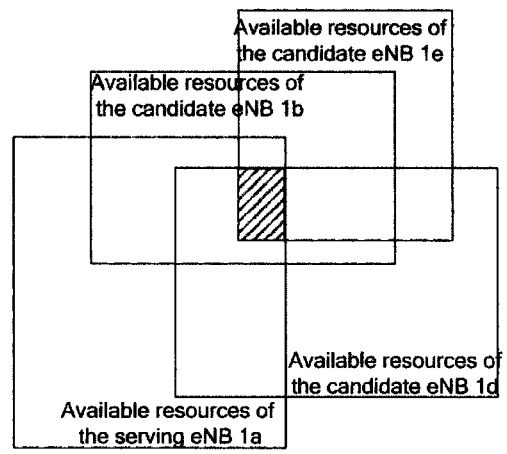
FIG. 5A to FIG. 5C respectively shows three different scenarios of common available resource between serving eNB and candidate eNB.
Figure 5B:
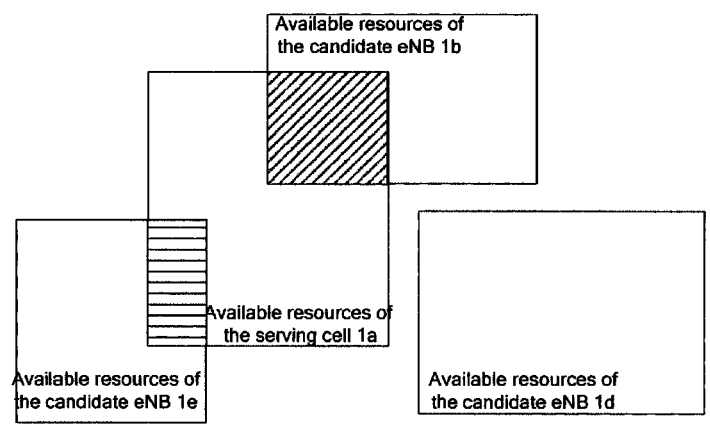
Figure 5C:
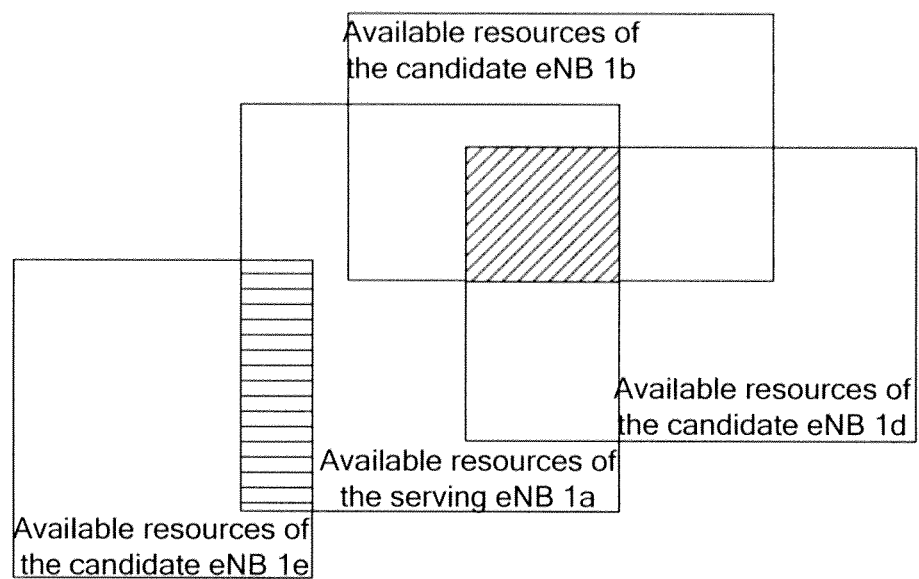

Since the scenario with two candidate eNBs is discussed hereinbefore, it is not necessary to repeat again. Hereinafter, the scenario with three candidate eNBs, for example, eNBs 1b, 1d and 1e, will be discussed, the available resources of each of three candidate eNBs may have common parts with the available resources of the serving eNB 1a or may not.

if the available resources of each of three candidate eNBs are not same with the available resources of the serving eNB 1a, that is, the available resources of each of three candidate eNBs do not overlap the available resources of the serving eNB 1a, then the method goes into step S153", the serving eNB 1a judges that all of three candidate eNBs can not cooperate with the serving eNB to perform CO-MIMO;

if the available resources of each of three candidate eNBs has common parts with the available resources of the serving eNB 1a, then in the step S151, the serving eNB 1a continues to judge whether there are suitable common available resources, for example, judge whether the common available resources of a plurality of candidate eNBs and the serving eNB 1a are partly same or identical. If the common available resources of candidate eNBs and serving eNB are shown as FIG. 5A, the same common available resources is denoted by the shadow with slash lines, then the serving eNB 1a judges to go into step S153, all of the three candidate eNBs may cooperate with the serving eNB 1a for collaborative MIMO on the same common available resources, and the serving eNB 1a accordingly allocates a part or all of resources corresponding to the shadow with slash lines for the serving eNB 1a and other eNBs 1b, 1d and 1e; if, for example, the common available resources between two candidate eNBs and serving eNB have overlapping parts, but there is no common available resource between another candidate eNB and serving eNB, then similarly, a part or all of the overlapping common available resources between the two candidate eNBs and the serving eNB are taken as resources for CO-MIMO;

if there are common available resources between each of a plurality of candidate eNBs and the serving eNB 1a respectively, and there is no common available resource between every two of the plurality of candidate eNBs, a candidate eNB whose signal quality with the MS is the best among the plurality of candidate eNBs is selected as collaborative eNB to cooperate with the serving eNB to serve the MS, according to the signal quality of each candidate eNB. FIG. 5B is taken as example, each of candidate eNB 1e and 1b has common available resources with the serving eNB 1a, but there is no same part between the two common available resources, then in step S 153', the serving eNB 1a selects a candidate eNB whose signal quality with the MS 2b is the best among candidate eNBs as collaborative eNB to cooperate with the serving eNB 1a. For example, the signal strength between eNB 1e and the MS 2b is 95 dBm and the signal strength between eNB 1b and the MS 2b is 88 dBm, then the serving eNB 1a selects eNB 1c as collaborative eNB, and selects a part or all of the common available resource, as shown by the shadow with transverse line in FIG. 5B, for the serving eNB 1a and collaborative eNB 1e to perform CO-MIMO;

if there are common available resources between not all of candidate eNBs 1b, 1d and 1e, and the serving eNB 1a, for example, as shown in FIG. 5C, candidate eNBs 1d and 1b have common available resources with the serving eNB 1a, as shown by the shadow with slash lines, and candidate eNB 1e has common available resources with the serving eNB 1a, as shown by the shadow with transverse lines, and these two common available resources have no intersection with each other, then in the step S153' the serving eNB 1a takes each candidate eNB, corresponding to common available resources available for allocation for the maximum number of candidate eNBs and for the serving eNB, as collaborative eNB to cooperate with the serving eNB1a to serve the MS 2b, that is, as shown in FIG. 5C, the serving eNB 1a takes eNBs 1d and 1b as collaborative eNBs, and allocates the resources for CO-MIMO for the serving eNB 1a, collaborative eNB 1b and collaborative eNB 1d according to corresponding common available resources shown by the shadow with slash lines.

It may be understood that the above-mentioned values of the first predetermined threshold, the second predetermined threshold and the third predetermined threshold are only exemplary, those skilled in the art may select suitable threshold values according to actual engineering requirement such as different network configuration. Furthermore, the values of signals in each embodiment are also only exemplary.

Figure 6:
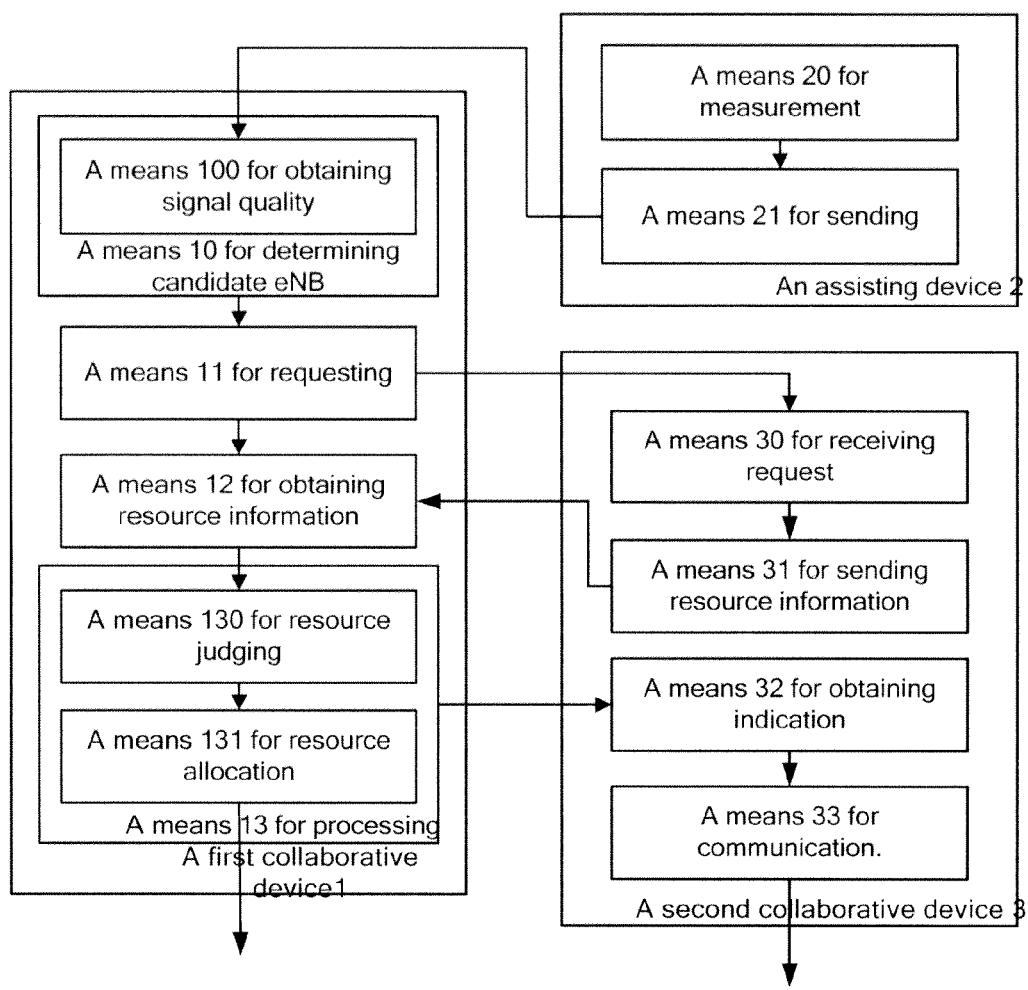
FIG. 6 shows a block diagram a detailed embodiment present invention.

Hereinbefore, the embodiments of the present invention are described in detail from the aspect of method; hereinafter, the embodiments of the present invention are described in detail from the aspect of device. FIG. 6 shows a block diagram of device of a detailed embodiment of the present invention.

Wherein, a first collaborative device 1 of serving eNB 1a, for allocating communication resources for the serving eNB and one or more collaborative eNBs that collaboratively process mobile station service, comprises a means 10 for determining candidate eNB, a means 11 for requesting, a means 12 for obtaining resource information and a means 13 for processing. Wherein, the means 10 for determining candidate eNB further comprises a means 100 for obtaining signal quality, the means 13 for processing further comprises a means 130 for resource judging and a means 131 for resource allocation.

An assisting device 2 of the MS 2a, for assisting a serving eNB in allocating communication resources for the serving eNB and one or more collaborative eNBs that collaboratively process mobile station service, comprises a means 20 for measurement, a means 21 for sending.

A second collaborative device 3 of the candidate eNBs 1b, 1c, for assisting the serving eNB in allocating communication resources for the serving eNB and one or more collaborative eNBs that collaboratively process mobile station service, comprises: a means 30 for receiving request, a means 31 for sending resource information, a means 32 for obtaining indication and a means 33 for communication.

The means 20 for measurement of the assisting device 2 of the MS 2a measures signal quality related information between the MS 2a and the serving eNB 1a, and between the MS 2a and each of other eNBs respectively. In this embodiment, signal quality related information is illustrated with signal strength. It may be understood that it is only exemplary here and signal quality related information is not limited to aforesaid contents and may be also RSSI (Received Signal Strength Indication), RSRP (Reference Signal Received Power), CQI (Channel Quality Indication) or CSI (Channel State Indication).

The MS 2a is located at cell edge area, the means 20 for measurement may detect signal strength with the serving eNB 1a and signal strength with each of neighboring cell eNBs 1b, 1c, and 1d, for example, which are 110 dBm, 92 dBm, 85 dBm and 50 dBm respectively.

Then, the means 21 for sending reports to the means 100 for obtaining signal quality of the eNB 1a signal quality related information with the serving eNB 1a and with each of a plurality of other eNBs. The signal quality related information comprises the type of the reported measurement value, which is RSSI in this embodiment, and further comprises the measured values.

Particularly, that when the MS 2a reports may be divided into the following two manners of:

event trigger:

in the phase of network entry, the MS 2a knows that it needs to report to the means 100 for obtaining signal quality of the serving eNB 1a other eNBs whose signal strengths exceed a third predetermined threshold value and the signal strengths corresponding to these eNBs in order to perform collaborative MIMO among a plurality of eNBs. For example, the reported threshold pre-stored in the MS 2a is 80 dBm, that is, when the means 20 for measurement detects that the signal strength corresponding to eNB exceeds 80 dBm, the means 20 for measurement will report to the serving eNB 1a this eNB and the signal strength corresponding to this eNB. For example, when the means 20 for measurement detects that the signal strengths with neighboring cell eNBs 1b, 1c and 1d are 92 dBm, 85 dBm and 50 dBm respectively, in order to reduce uplink signaling overhead and increase the reliability of collaborative MIMO, the means 21 for sending only reports to the serving eNB 1a the neighboring cell eNBs having good signal qualities, that is, the eNB whose signal strengths exceeds the third predetermined threshold, comprising: eNB 1b and eNB 1c, and signal strength between the MS 2a and eNB 1b, signal strength between the MS 2a and eNB 1c. Therefore, the means 21 for sending reports to the serving eNB 1a, the serving eNB 1a and other eNBs 1b and 1c, whose signal strength with the MS 2a are 110 dBm 92 dBm and 85 dBm, respectively.

Or, in a varied embodiment, it may be specified that the MS 2a only reports the signal strength of the two neighboring cell eNBs whose measured signal strengths are the strongest. The aforesaid parameters are still taken as example, then the means 21 for sending reports to the serving eNB 1a signal strengths of the serving eNB 1a and the two neighboring cell eNBs whose signal strengths are the strongest, which are 110 dBm, 92 dBm and 85 dBm respectively.

Furthermore, alternatively, if the uplink signaling overhead of system is not considered, once the MS 2a detects signal from a neighboring cell eNB, it may report to the serving eNB 1a this neighboring cell eNB and signal strength corresponding to this neighboring cell eNB, that is, the MS 2a reports to the serving eNB 1a all of the detected signal strengths and eNBs corresponding to these detected signal strengths. For example, the MS 2a reports the signal strengths with the serving eNB 1a and eNBs 1b, 1c, and 1d, which are 110 dBm, 92 dBm 85 dBm and 50 dBm respectively.

periodical trigger:

the MS 2a comprises timer for sending measurement report, when the timer reaches a predetermined time, it means that the MS 2a needs to report to the means 100 for obtaining signal quality of the serving eNB 1a the detected signal quality related information of a plurality of other eNBs. For example, if the timer expires, the means 21 for sending reports to the means 100 for obtaining signal quality of the serving eNB 1a the signal strengths between each of the serving eNB 1a, other eNBs 1b and 1c and the MS 2a, which are 110 dBm, 92 dBm and 85 dBm respectively; or the means 21 for sending reports the signal strengths with each of the serving eNB 1a, eNBs 1b, 1c and 1d, which are 110 dBm, 92 dBm 85 dBm and 50 dBm respectively.

The means 10 for determining candidate eNB, of the first collaborative device 1 of the serving eNB 1a, determines eNBs 1b and 1c as candidate eNBs according to signal quality related information reported by the MS 2a.

Particularly, a first predetermined threshold value is prestored in the means 10 for determining candidate eNB, the first predetermined threshold value is used for selecting candidate eNB, desired by the serving eNB 1a to collaboratively process service of the MS 2a with this serving eNB 1a, according to physical signal strength. When the means 10 for determining candidate eNB selects candidate eNB, at least the magnitude of RSSI value is considered, moreover, the means 10 for determining candidate eNB may also need to consider the difference value of signal strength between eNB 1b and eNB 1c.

For example, the first predetermined threshold value prestored in the means 10 for determining candidate eNB is 90 dBm, and a second predetermined threshold value is 10 dBm. The second predetermined threshold value is used for judging the difference level of signal strength among a plurality of other eNBs.

The aforesaid parameters are still taken as example. The means 10 for determining candidate eNB firstly judges whether signal strength from other eNBs is higher than the first predetermined threshold value 90 dBm.

if the signal strengths of both neighboring cell eNBs are higher than the first predetermined threshold value, then these two neighboring cell eNBs are both taken as candidate eNBs. For example, for the MS 2b, as shown in FIG. 1, the MS 2b reports to the serving eNB 1a the signal strengths with each of the serving eNB 1a, other eNBs 1d and 1e. If the signal strengths between the MS 2b and each of neighboring cell eNBs 1d and 1e, which are obtained by the means 100 for obtaining signal quality and are from the report of the MS 2b, are 95 dBm and 105 dBm respectively, both being higher than 90 dBm, then the means 10 for determining candidate eNB takes both eNBs 1d and 1e as candidate eNBs.

if the signal strength value of only one eNB of two neighboring cell eNBs is higher than the first predetermined threshold value, and the difference value between signal strengths of the two neighboring cell eNBs is higher than the second predetermined threshold value, then the means 10 for determining candidate eNB only takes the eNB, whose signal strength is higher than the first predetermined threshold value, as candidate eNB. For example, for the MS 2c, as shown in FIG. 1, the MS 2c reports to the serving eNB 1a the signal strengths with each of the serving eNB 1a, other eNBs 1b and 1g. If the signal strengths between the MS 2c and each of neighboring cell eNBs 1b and 1g, which are obtained by the means 100 for obtaining signal quality and are from the report of the MS 2c, are 100 dBm and 80 dBm respectively, only 100 dBm being higher than 90 dBm, and the difference value of these two signal strengths is 20 dBm, higher than the second predetermined threshold value 10 dBm, then the means 10 for determining candidate eNB only takes other eNBs 1b as candidate eNB.

if the signal strength value of only one eNB of two neighboring cell eNBs is higher than the first predetermined threshold value, and the difference value between signal strengths of the two neighboring cell eNBs is less than the second predetermined threshold value, then the means 10 for determining candidate eNB takes both two neighboring cell eNBs as candidate eNBs. For example, for the MS 2a, the MS 2a reports to the serving eNB 1a the signal strengths with each of the serving eNB 1a, other eNBs 1b and 1c. The signal strengths between the MS 2a and each of neighboring cell eNBs 1b and 1c, which are obtained by the means 100 for obtaining signal quality and are from the report of the MS 2a, are 92 dBm and 85 dBm respectively, only 92 dBm being higher than 90 dBm, and the difference value of these two signal strengths is 7 dBm, less than the second predetermined threshold value 10 dBm, then the means 10 for determining candidate eNB takes both other eNBs 1b and 1c as candidate eNBs. This practice broadens the limitation to signal strength of neighboring cell eNB, since the different value of respective signal strength of two neighboring cell eNBs is less than the second predetermined threshold value, signal strengths are relative close to each other so that it will not cause the weaker signal to be submerged because one signal is too strong and the other is too weak.

Then, the means 11 for requesting sends resource related information request message to eNB 1b and eNB 1c.

In order to reduce redundant information interaction between the serving eNB 1a and other eNBs, the means 11 for requesting sends resource related information request message only to the candidate eNB selected by it. For example, the means 11 for requesting sends resource related information request message to the selected candidate eNBs 1b and 1c. The resource related information request message is used for requesting the candidate eNBs 1b and 1c to send resource related information to the serving eNB 1a. The means 11 for requesting interacts with other eNBs via X2 interfaces.

After the means 30 for receiving request of the second collaborative device 3 of the candidate eNBs 1b, 1c receives the resource related information request message from the serving eNB 1a, their means 31 for sending resource information respectively send respective resource related information to the serving eNB 1a. The means 12 for obtaining resource information, of the serving eNB 1a, may extract information related to available resource of eNBs 1b and 1c from the resource related information.

Certainly, there are at least two kinds of forms of resource related information: indication information of the occupied resource and indication information of the available resource.

Bit MAP is taken as example to illustrate resource related information. For example, the available bandwidth for each eNB is 5M, assuming multiplexing coefficient is 1, that is, each eNB may use the same frequency resource. For each eNB, for example, the allocation granularity of bandwidth 5M is RB (Resource Block). In hit MAP, 0 denotes that the resource block is available namely idle, 1 denotes that the resource block is not available, that is, the resource block has already been allocated, or vice versa. And bit MAP is indexed to form pattern of resource related information.

For example, in respective resource related information which eNBs 1b and 1c respectively send to the serving eNB 1a, the pattern of the resource related information of eNB 1b indicates that the resource blocks number 5 to number 33 of eNB 1b are not allocated and are still available, the pattern of the resource related information of eNB 1c indicates that the resource blocks numbers 17 to 40 of eNB 1c are available.

The means 13 for processing of the first collaborative device 1 determines collaborative eNB among eNBs 1b and 1c according to resource related information of eNBs 1b and 1c, and allocates corresponding communication resources.

In the following scenarios, several judging scenarios judged by the means 130 for resource judging, in which there are common available resources among the serving eNB 1a and each of eNBs 1b and 1c, are discussed respectively:

i) there is no common available resource either between the serving eNB 1a and eNBs 1b or between the serving eNB 1a and eNBs 1c:

for example, the available resources of the serving eNB 1a are the resource blocks number 45 to number 60, the aforesaid parameters are still taken as example, that is, the available resources of eNB 1b are the resource blocks number 5 to number 33, the available resources of eNB 1c are the resource blocks number 17 to number 40. The available resources of the serving eNB 1a do not have intersection either with the available resources of eNB 1b or with the available resources of eNB 1c. Therefore, the serving eNB 1a can not perform collaborative MIMO with neighboring cell eNB.

ii) there are same common available resources among the serving eNB 1a, eNB 1b and eNB 1c:

for example, the available resources of the serving eNB 1a are the resource blocks number 10 to number 25, the aforesaid parameters are still taken as example, that is, the available resources of eNB 1b are the resource blocks number 5 to number 33, the available resources of eNB 1c are the resource blocks number 17 to number 40. The resource blocks number 17 to number 25 are the same common available resources among the serving eNB 1a and eNB 1b and eNB 1c. Therefore, the means 13 for processing takes both eNB 1b and eNB 1c as collaborative eNBs for collaborative MIMO, and the means 131 for resource allocation of the means 13 for processing allocates resources in the resource blocks number 17 to number 25 for eNB 1b and eNB 1c.

iii) there are respectively common available resources between the serving eNB 1a and eNB 1b and between the serving eNB 1a and eNB 1c, but the common available resources between the serving eNB 1a and eNB 1b does not have intersection with the common available resources between the serving eNB 1a and eNB 1c:

for example, the available resources of the serving eNB 1a are the resource blocks number 10 to number 25 and the resource blocks number 50 to number 64, the available resources of eNB 1b are the resource blocks number 15 to number 45, the available resources of eNB 1c are the resource blocks number 40 to number 60. Therefore, the resource blocks number 15 to number 25 are the common available resources between the serving eNB 1a and eNB 1b, the resource blocks number 50 to number 60 are the common available resources between the serving eNB 1a and eNB 1c, these two common available resources do not have intersection between each other. Now, the serving eNB 1a further selects the one with better signal quality as collaborative eNB according to signal qualities of the two candidate eNBs. For example, the signal strength between eNB 1b and the MS 2a is 92 dBm, the signal strength between eNB 1c and the MS 2a is 85 dBm. Since the signal strength between eNB 1b and the MS 2a is higher than the signal strength between eNB 1c and the MS 2a, the means 13 for processing selects eNB 1b as collaborative eNB.

Then, the serving eNB 1a determines corresponding MCS (Modulation and Coding Scheme) according to QoS (Quality of Service) of the service requested by the MS 2a, and allocates a part or all of common available resources for the serving eNB 1a and the determined collaborative eNB according to the MCS, granularity of resource allocation, single allocation or allocation in pairs, to perform collaborative MIMO. For example, the scenario i) is taken as example, the means 131 for resource allocation allocates the resource blocks number 18 to number 21 of the resource blocks number 17 to number 25 for the serving eNB 1a, eNB 1b and eNB 1c, so that the serving eNB 1a, eNB 1b and eNB 1c perform collaborative MIMO on the same resource blocks number 18 to number 21, and sends collaborative MIMO request to eNB 1b and eNB 1c, which comprises the sequence number 18-21 of the resource blocks for collaborative MIMO, allocated for eNB 1b and eNB 1c by the serving eNB 1a.

Then, the means 32 for obtaining indication, of the second collaborative device 3, obtains resource allocation indication message from the first collaborative device, the resource allocation indication message is used for indicating this candidate eNB as collaborative eNB and indicating corresponding communication resource allocated for the collaborative eNB; and the means 33 for communication, determines this candidate eNB as collaborative eNB to cooperate with the serving eNB to serve the MS 2a, according to the resource allocation indication message obtained by the means 32 for obtaining indication, and cooperates with the serving eNB to serve the MS with the corresponding communication resource.

In a varied embodiment, the first collaborative device 1 sends to the MS 2a measurement control message for requesting measurement report, the measurement control message comprises the type of the desired MS measurement and the threshold value of the reported measurement value. Then, the means 20 for measurement of the MS 2a measures and reports according to the measurement control message received from the serving eNB 1a.

In aforesaid embodiment, the means 10 for determining candidate eNB of the serving eNB 1a obtains the measurement report reported by the MS 2a, the measurement report comprises not only the signal quality between the MS 2a and the serving eNB 1a but also the signal quality between the MS 2a and other eNBs. In a varied embodiment, for example, for TDD system, the serving eNB 1a may measure via uplink sounding signal and obtain corresponding downlink signal quality from uplink signal quality according to the reciprocity of TDD system, therefore, the serving eNB 1a may measure signal quality with the MS 2a by itself and receive signal quality related information between this MS and other eNB, reported by the MS 2a. That is, the MS 2a does not need to report to its serving eNB 1a the signal quality related information between the MS 2a and the serving eNB 1a.

In aforesaid embodiment, existing measurement control and measurement report between each MS and serving eNB may be reused. In a varied embodiment, considering that MS develops towards the trend of more intelligent, its computing speed and process capability are higher and higher. Therefore, a kind of new signaling may be defined, or a kind of new measurement type is defined in measurement types, so the MS comprises a means for recommendation (not shown in Fig), for judging that which neighboring cell eNBs are selected as candidate eNBs according to measurement results with the serving eNB 1a and neighboring eNBs (for example, eNB 1b, eNB 1c), measured by itself, and generating corresponding candidate eNB indication information and sends the candidate eNB indication information to the means 10 for determining candidate eNB of the first collaborative device 1. The detailed judging process is described in details hereinbefore, it is not necessary to repeat again. Then, the means 12 for obtaining resource information of the eNB sends resource related information request message to corresponding candidate eNB according to candidate eNB indication information from the MS 2a.

That the means 11 for requesting sends resource related information request message to eNB 1b and eNB 1c is for the purpose of reducing signaling overhead between eNB and eNB. Without considering signaling overhead, the means 11 for requesting may be omitted, example, neighboring eNBs may report their resource related information to the means 12 for obtaining resource information of the serving eNB 1a periodically, and it is not necessary for neighboring eNBs to trigger the report upon receiving the request message from the means 11 for requesting.

In aforesaid embodiment, the scenario in which the MS 2a reports to the serving eNB 1a the signal strengths between the MS 2a and each of two neighboring cell eNBs, is taken as example for illustration. In a varied embodiment, the MS 2b is taken as example, for example, the MS 2b reports to the serving eNB 1a the signal strengths between the MS 2a and each of a plurality of neighboring cell eNBs, which comprise eNB 1d, eNB 1e and eNB 1b. Hereinafter, the first collaborative device 1 is described as follows according to another embodiment:

Firstly, the means 10 for determining candidate eNB firstly judges whether the signal strength between each of three neighboring cell eNBs and the MS 2b is higher than the first predetermined threshold.

if the judging result of the means 10 for determining candidate eNB is that the signal strength between each of three neighboring cell eNBs and the MS 2b is higher than the first predetermined threshold, then it takes all of three neighboring eNBs 1b, 1d and 1e as candidate eNBs for collaborative MIMO;

if the judging result of the means 10 for determining candidate eNB is that not all the signal strengths from the three neighboring cell eNBs are higher than the first predetermined threshold, for example, the signal strength from eNB 1b is less than the first predetermined threshold, but the signal strengths from eNB 1d and eNB 1e are higher than the first predetermined threshold, the means 10 for determining candidate eNB judges whether the difference value between the signal strength of the one that is less than the first predetermined threshold, and the signal strength of the minimal in these signal strengths which are higher than the first predetermined threshold, is higher than the second predetermined threshold. For example, the first predetermined threshold is 90 dBm, and the second predetermined threshold is 10 dBm. The signal strengths from eNB 1d and eNB 1e are respectively 100 dBm and 92 dBm, and the signal strength from eNB 1b is 88 dBm. The means 10 for determining candidate eNB firstly judges that the signal strengths from eNB 1d and eNB 1e are higher than the first predetermined threshold, but the signal strength from eNB 1b is less than the first predetermined threshold, thus the means 10 for determining candidate eNB firstly takes eNBs 1d and 1e as candidate eNBs, then the serving eNB 1a further compares the difference value between the signal quality from eNB 1b and the signal quality from eNB 1e, the serving eNB finds that the difference value of the signal quality from eNB 1e 92 dBm minus the signal quality from eNB 1b 88 dBm is less than the second predetermined threshold, thus the means 10 for determining candidate eNB also takes eNBs 1b as candidate eNB;

if the first predetermined threshold is 90 dBm, and the second predetermined threshold is 10 dBm, the signal strengths from eNB 1d and eNB 1e are respectively 100 dBm and 95 dBm, and the signal strength from eNB 1b is 80 dBm. Then the judging result of the means 10 for determining candidate eNB is that the difference value of the signal strength between eNB 1b and MS, and the signal strength between eNB 1e and MS is higher than the second predetermined threshold, thus the means 10 for determining candidate eNB only takes the two neighboring cell eNBs 1d and 1e as candidate eNBs for collaborative MIMO;

furthermore, if the signal quality of only one eNB is higher than the first predetermined threshold, for example, only the signal quality of eNB 1d is higher than the first predetermined threshold, and the difference value of signal quality between eNB 1b and eNB 1d, and the difference value of signal quality between eNB 1e and eNB 1d are both higher than the second predetermined threshold, then the judging result of the means 10 for determining candidate eNB is that only eNB 1d is taken as candidate eNB for collaborative MIMO.

Then, the means 11 for requesting of the serving eNB 1a sends resource related information request message to the selected candidate eNB; then, means 12 for obtaining resource related information obtains resource related information from each candidate eNB.

Then, the means 130 for resource judging of the means 13 for processing of the serving eNB 1a judges whether the available resources from each candidate eNB overlaps the available resources of the serving eNB 1a.

Since the scenario with two candidate eNBs is discussed hereinbefore, it is not necessary to repeat again. Hereinafter, the scenario with three candidate eNBs, for example, eNBs 1b, 1d and 1e, will be discussed, the available resources of each of three candidate eNBs may have common parts with the available resources of the serving eNB 1a or may not.

if the available resources of each of three candidate eNBs are not same with the available resources of the serving eNB 1a, that is, the available resources of each of three candidate eNBs do not overlap the available resources of the serving eNB 1a, the means 130 for resource judging judges that all of three candidate eNBs can not cooperate with the serving eNB to perform CO-MIMO;

if the available resources of each of three candidate eNBs has common parts with the available resources of the serving eNB 1a, then the means 130 for resource judging continues to judge whether there are suitable common available resources, for example, judge whether the common available resources of a plurality of candidate eNBs and the serving eNB 1a are partly same or identical. If the common available resources of candidate eNBs and serving eNB are shown as FIG. 5A, the same common available resources is denoted by the shadow with slash lines, then the means 130 for resource judging judges all of the three candidate eNBs may cooperate with the serving eNB 1a for collaborative MIMO on the same common available resources, and the serving eNB 1a accordingly allocates a part or all of resources corresponding to the shadow with slash lines for the serving eNB 1a and other eNBs 1b, 1d and 1e; if for example, the common available resources between two candidate eNBs and serving eNB have overlapping parts, but there is no common available resource between another candidate eNB and serving eNB, then similarly, a part or all of the overlapping common available resources between the two candidate eNBs and the serving eNB are taken as resources for CO-MIMO;

if there are common available resources between each of a plurality of candidate eNBs and the serving eNB 1a respectively, and there is no common available resource between every two of the plurality of candidate eNBs, a candidate eNB whose signal quality with the MS is the best among the plurality of candidate eNBs is selected as collaborative eNB to cooperate with the serving eNB to serve the MS, according to the signal quality of each candidate eNB. FIG. 5B is taken as example, each of candidate eNB 1e and 1b has common available resources with the serving eNB 1a, but there is no same part between the two common available resources, then the means 13 for processing selects a candidate eNB whose signal quality with the MS 2b is the best among candidate eNBs as collaborative eNB to cooperate with the serving eNB 1a. For example, the signal strength between eNB 1e and the MS 2b is 95 dBm and the signal strength between eNB 1b and the MS 2b is 88 dBm, then the serving eNB 1a selects eNB 1e as collaborative eNB, and selects a part or all of the common available resource, as shown by the shadow with transverse line in FIG. 5B, for the serving eNB 1a and collaborative eNB 1e to perform CO-MIMO;

if there are common available resources between not all of candidate eNBs 1b, 1d and 1e, and the serving eNB 1a, for example, as shown in FIG. 5C, candidate eNBs 1d and 1b have common available resources with the serving eNB 1a, as shown by the shadow with slash lines, and candidate eNB 1e has common available resources with the serving eNB 1a, as shown by the shadow with transverse lines, and these two common available resources have no intersection with each other, then the means 13 for processing takes each candidate eNB, corresponding to common available resources available for allocation for the maximum number of candidate eNBs and for the serving eNB, as collaborative eNB to cooperate with the serving eNB1a to serve the MS 2b, that is, as shown in FIG. 5C, the serving eNB 1a takes eNBs 1d and 1b as collaborative eNBs, and allocates the resources for CO-MIMO for the serving eNB 1a, collaborative eNB 1b and collaborative eNB 1d according to corresponding common available resources shown by the shadow with slash lines.

The embodiments of the present invention have been described above, but the present invention is not limited to a specific system, equipment and specific protocol, those skilled in the art may make variation and modification within the scope of the appended claims.

The invention claimed is:

1. A method, in a serving eNodeB (eNB) of a wireless communication network based on collaborative Multiple-Input-Multiple-Output, for allocating communication resources for the serving eNB and one or more collaborative eNBs that collaboratively process mobile station service, wherein the method comprises:
   determining, of the one or more other eNBs, at least one candidate eNB recommended to cooperate with the serving eNB;
   obtaining resource related information of the at least one candidate eNB;
   determining one or more collaborative eNBs from the at least one candidate eNB according to the resource related information, and allocating corresponding communication resources for the serving eNB and the one or more collaborative eNBs.

2. The method according to claim 1, further comprising at least one of:
   sending a resource related information request message to the at least one candidate eNB, the resource related information request message being used for requesting the at least one candidate eNB to send resource related information to the serving eNB; and
   sending, a resource allocation indication message for indicating a corresponding communication resource allocated for each of the collaborative eNBs, to each of the collaborative eNBs.

3. The method according to claim 1, wherein, the determining the at least one candidate eNB further comprises:
   receiving candidate eNB indication message from a mobile station, wherein the candidate eNB indication message is used for indicating at least one candidate eNB, recommended by the mobile station, to cooperate with the serving eNB;
   determining the at least one candidate eNB according to the candidate eNB indication message;
   or determining the at least one candidate eNB further comprises
   obtaining signal quality related information between the mobile station and the serving eNB, and between the mobile station and one or more other eNBs;
   determining at least one candidate eNB recommended to cooperate with the serving eNB, of the one or more other eNBs, according to the signal quality related information.

4. The method according to claim 3, wherein the signal quality related information comprises information for indicating signal quality between the mobile station and the one or more other eNBs, and the determining at least one candidate eNB further comprises:
   determining the at least one other eNB as at least one candidate eNB recommended to cooperate with the serving eNB, when the signal quality related information indicates that signal quality between the mobile station and at least one other eNB, of the one or more other eNBs, exceeds a first predetermined threshold value.

5. The method according to claim 4, wherein the method further comprises:
   judging whether difference values between one or more signal qualities corresponding to one or more other eNBs whose signal qualities with the mobile station are less than the first predetermined value among one or more other eNBs and candidate signal quality of candidate eNB whose signal quality with the mobile station is worst among the at least one candidate base, is less than a second predetermined threshold;

taking at least one other eNB corresponding to at least one signal quality as the at least one candidate eNB recommended to cooperate with the serving eNB, if the difference value between at least one signal quality among one or more signal qualities which are less than the first predetermined value and the candidate signal quality is less than the second predetermined threshold.

6. The method according to claim 1, wherein, the resource related information is used for indicating current resource occupying status of the at least one candidate eNB, and the determining at least one candidate eNB further comprises:

judging whether there are common available resources between the at least one candidate eNB and the serving eNB according to the current resource occupying status of the at least one candidate eNB;

taking the one or more candidate eNBs as at least one collaborative eNB to cooperate with the serving eNB to serve the mobile station, and allocating corresponding common communication resources for the serving eNB and the each collaborative eNB according to the same common available resources, if there are the same common available resources among one or more candidate eNBs of the at least one candidate eNB and the serving eNB.

7. The method according to claim 6, wherein, the signal quality related information comprises information for indicating signal quality between the mobile station and the one or more other eNBsand the method further comprises:

selecting a candidate eNB whose signal quality with the mobile station is the best among a plurality of candidate eNBs as collaborative eNB to cooperate with the serving eNB to serve the mobile station according to the signal qualities, and allocating corresponding common communication resources for the serving eNB and collaborative eNB according to the common available resources corresponding to the collaborative eNB, if there are common available resources between each of a plurality of candidate eNBs of the at least one candidate eNB and the serving eNB and there is no common available resource between every two of the plurality of candidate eNBs.

8. The method according to claim 6, wherein the method further comprises:

taking each candidate eNB corresponding to common available resources allocated for the maximum number of candidate eNBs and the serving eNB as collaborative eNB to cooperate with the serving eNB to serve the mobile station if there are common available resources between not all of the at least one candidate eNB and the serving eNB, and allocating corresponding common communication resource for the serving eNB and each of the collaborative eNBs according to the common available resources.

9. The method according to claim 6, wherein, the common communication resource comprises a plurality of time frequency resource blocksand the method further comprises:

obtaining quality of service related information of the service requested by the mobile station; wherein:

the allocating corresponding common communication resources for the serving eNB and each of the collaborative eNBs further comprises:

allocating, a part or all of time frequency resource blocks of the common available resources corresponding to the one or more collaborative eNBs, for the serving eNB and the one or more collaborative eNBs, according to the quality of service related information.

10. A method, in a candidate eNB of a wireless communication network based on collaborative Multiple-Input-Multiple-Output, for assisting a serving eNB in allocating communication resources for the serving eNB and one or more collaborative eNBs that collaboratively process mobile station service, wherein the method comprises:

sending resource related information of the candidate eNB to the serving eNB;

receiving a resource allocation indication message from the serving eNB, wherein the resource allocation indication message is used for indicating the candidate eNB as the collaborative eNB, and indicating at least one corresponding communication resource allocated for the collaborative eNB; and determining the candidate eNB as the collaborative eNB to cooperate with the serving eNB to serve the mobile station, and cooperating with the serving eNB to serve the mobile station with the corresponding communication resource, according to the resource allocation indication message.

11. The method according to claim 10, wherein the method further comprises:

receiving a resource related information request message from the serving eNB, the resource related information request message requesting the candidate eNB to send resource related information to the serving eNB.

12. A method, in a mobile station of a wireless communication network based on collaborative Multiple-Input-Multiple-Output, for assisting a serving eNB in allocating communication resources for the serving eNB and one or more collaborative eNBs that collaboratively process mobile station service, wherein the method comprises:

measuring signal quality related information between the mobile station and the serving eNB, and between the mobile station and one or more other eNBs;

determining at least one candidate eNB recommended to cooperate with the serving eNB, according to the signal quality related information; and generating candidate eNB indication information for indicating the at least one candidate eNB according to the at least one candidate eNB, and sending the candidate eNB indication information to the serving base station.

13. The method according to claim 12, wherein, the signal quality related information comprises information for indicating signal quality between the mobile station and the one or more other eNBs, the determining at least one candidate eNB further comprising:

determining at least one other eNB as at least one candidate eNB recommended to cooperate with the serving eNB, when the signal quality related information indicates that signal quality between the mobile station and the at least one other eNB, of the one or more other eNBs, exceeds a first predetermined threshold value.

14. The method according to claim 13, wherein the method further comprises:

judging whether difference values between one or more signal qualities corresponding to one or more other eNBs whose signal quality with the mobile station are less than a first predetermined value among one or more other eNBs, and candidate signal quality of candidate eNB whose signal quality with the mobile station is worst among at least one candidate base, is less than a second predetermined threshold; and taking at least one other eNB corresponding to the at least one signal quality as the at least one candidate eNB recommended to cooperate with the serving eNB, if the difference values between at least one signal quality among one or more signal qualities which are less than the first predetermined value and the candidate signal quality is less than the second predetermined threshold.

* * * * *